US011125977B2

(12) United States Patent
Choi et al.

(10) Patent No.: US 11,125,977 B2
(45) Date of Patent: Sep. 21, 2021

(54) HIGH-RESOLUTION WIDE ANGLE LENS SYSTEM

(71) Applicant: SEKONIX CO., LTD., Gyeonggi-do (KR)

(72) Inventors: Soon Cheol Choi, Gyeonggi-do (KR); Ki Youn Noh, Gyeonggi-do (KR); Sung Nyun Kim, Incheon (KR)

(73) Assignee: SEKONIX CO., LTD.

( * ) Notice: Subject to any disclaimer, the term of this patent is extended or adjusted under 35 U.S.C. 154(b) by 41 days.

(21) Appl. No.: 16/357,961

(22) Filed: Mar. 19, 2019

(65) Prior Publication Data

US 2020/0183130 A1    Jun. 11, 2020

(30) Foreign Application Priority Data

Dec. 10, 2018  (KR) .................. 10-2018-0158097

(51) Int. Cl.
*G02B 13/00*  (2006.01)
*G02B 9/62*   (2006.01)

(52) U.S. Cl.
CPC ........... *G02B 13/0045* (2013.01); *G02B 9/62* (2013.01)

(58) Field of Classification Search
CPC ......... G02B 13/0045; G02B 9/62; G02B 9/64
See application file for complete search history.

(56) References Cited

U.S. PATENT DOCUMENTS

| 2016/0124189 A1* | 5/2016 | Park, II | G02B 13/0045 359/758 |
| 2018/0299649 A1* | 10/2018 | Hsu | G02B 9/62 |
| 2018/0348480 A1* | 12/2018 | Sekine | H04N 5/335 |

FOREIGN PATENT DOCUMENTS

KR           20160108080 A       9/2016

* cited by examiner

*Primary Examiner* — Christopher Stanford
*Assistant Examiner* — Journey F Sumlar
(74) *Attorney, Agent, or Firm* — Mendelsohn Dunleavy, P.C.

(57) ABSTRACT

The present invention relates to a high-resolution wide angle lens system consisting of a total of six lens, wherein the first lens has a negative refractive power, the second lens has a positive refractive power, the third lens has a positive or negative refractive power, the fourth lens has a positive or negative refractive power, the fifth lens has a positive or negative refractive power with a concave shape on an object side and a convex shape on an image side, and the sixth lens has a positive or negative refractive power, and the system is satisfied with $0<|f/f5|<1$ (herein, f represents an effective focal length of the entire lens system, and f5 represents an effective focal length of the fifth lens).

7 Claims, 7 Drawing Sheets

HIGH-RESOLUTION WIDE ANGLE LENS SYSTEM

CROSS REFERENCE TO RELATED APPLICATION

The present application claims priority to Korean Patent Application No. 10-2018-0158097, filed Dec. 10, 2018, the entire contents of which is incorporated herein for all purposes by this reference.

BACKGROUND OF THE INVENTION

Field of the Invention

The present invention relates to a high-resolution wide angle lens system consisting of a total of six lens and, more particularly, to a high-resolution wide angle lens system in which the refractive power and shape of the lens and a focal length of a fifth lens are properly designed thereby correcting distortion while making the system compact and lightweight, and the refractive power of a fifth lens is reduced thereby lowering the sensitivity of the system and making easy the performance reproduction and processing of the system.

Description of the Related Art

Recently, the use of portable terminals such as a mobile phone camera and a digital camera is increasing, and a demand for diversification of required services, such as photographing, image transmission, or communication, is becoming strong.

Particularly, a demand for mobile phone cameras is getting stronger, and a mobile phone of a new concept expanded by combining digital camera technology with mobile phone technology into a so-called camera phone or camera mobile phone is highly spotlighted.

In response to such demands for high performance, research on camera modules having a high-resolution imaging device and lens system has been conducted more actively.

A lens system for realizing functions of high image quality and high performance includes at least three lenses and constitutes an optical system for projecting an image of the subject onto an imaging device by using the multiple lenses.

As a technique for such lens system in the related art, there is a description of a lens system with six lenses in U.S. Pat. No. 9,304,295, the lens system consisting of a first lens having a negative refractive power, a second lens and a third lens having a positive refractive power, a fourth lens having a concave surface on the object side, a fifth lens having a convex surface on the object side and a concave surface on the image side, and a sixth lens having a concave surface on the image side, in this order from the object side to the image side, and being satisfied with conditions of $0<(f1+f2)/(f1-f2)<1.0$, and $f/f5<0.55$.

In addition, as a technique for another lens system in the related art, the lens system of U.S. Pat. No. 8,743,477 has a first lens having a negative refractive power and having a convex surface on the object side and a concave surface on the image side, a second lens and a third lens having a positive refractive power, a fourth lens with one surface being an aspheric surface, a fifth lens having a positive refractive power and a convex surface on the image side with both surfaces being aspheric surfaces, and a sixth lens having negative refractive power with both surfaces being aspheric surfaces, and is satisfied with conditions of $0<f/f2<1.0$ and $|R10/R9|<0.9$.

In cases of the lens systems in the related art, the refractive power is concentrated mostly on the first lens and the second lens, whereby there is a problem that the refracting power is highly dependent on the first lens and the second lens thereby causing high sensitivity.

Particularly, when the sensitivity is increased in the ultra-small lens system, the designing and processing of the system becomes complicated, whereby the performance differs from system to system, and the productivity is greatly reduced.

In addition, as the portable terminal gradually becomes slimmer in size and higher in performance, the size of the camera module is gradually becoming smaller, and accordingly the pixel size of the imaging device is reduced to 1.12 µm or less. Accordingly, there has been an increasing need to develop a lens system having low F-number which is 2.3 or less, which can realize high-resolution even under the above conditions.

In addition, as the lens system is miniaturized, the specific lens is very thin in thickness and difficult to process, whereby there is a problem that the injection property of the plastic lens is deteriorated thereby lowering the productivity of the lens.

Therefore, it is necessary to develop a lens system including a lens having a gentle shape so as to facilitate the injection of a shape while having the same power by using a high refractive lens.

SUMMARY OF THE INVENTION

Accordingly, the present invention has been made keeping in mind the above problems occurring in the related art, and an object of the present invention is to provide a high-resolution wide angle lens system in which the refractive power and shape of the lens and a focal length of a fifth lens are properly designed thereby correcting distortion while making the system compact and lightweight, and the refractive power of a fifth lens is reduced thereby lowering the sensitivity of the system and making easy the performance reproduction and processing of the system.

In order to achieve the above object, a high-resolution wide angle lens system according to the present invention includes a first lens, a second lens, a third lens, a fourth lens, a fifth lens, and a sixth lens arranged in this order from an object along an optical axis, wherein the first lens has a negative refractive power, the second lens has a positive refractive power, the third lens has a positive or negative refractive power, the fourth lens has a positive or negative refractive power, the fifth lens has a positive or negative refractive power with a concave shape on an object side and a convex shape on an image side, and the sixth lens has a positive or negative refractive power, and the system is satisfied with $0<|f/f5|<1$ (herein, f represents an effective focal length of the entire lens system, and f5 represents an effective focal length of the fifth lens).

In addition, the high-resolution wide angle lens system may be preferably satisfied with $0.9 \le |R9ASP\text{-}H/R9SPH\text{-}H| \le 1.1$ (herein, R9ASP-H represents a height from a center of an effective diameter in the case that the effective diameter is for an aspheric surface on the object side of the fifth lens, and R9SPH-H represents a height from a center of an effective diameter in the case that the effective diameter is for a spherical surface R on the object side of the fifth lens).

In addition, the high-resolution wide angle lens system may be preferably satisfied with |R10/R9|>0.5 (herein, R9 represents a curvature radius on the object side of the fifth lens, and R10 represents a curvature radius on the image side of the fifth lens).

In addition, the high-resolution wide angle lens system may be preferably satisfied with R10/f<−1.5 (herein, R10 represents a curvature radius on the image side of the fifth lens, and f represents the effective focal length of the entire lens system).

In addition, the high-resolution wide angle lens system may be preferably satisfied with N1>N2 (herein, N1 is a refractive index of the first lens, and N2 is a refractive index of the second lens).

In addition, the high-resolution wide angle lens system may be preferably satisfied with 1<TTL/f<2 (herein, TTL represents a thickness from an object side to an image side of the first lens, and f represents the effective focal length of the entire lens system).

In addition, the high-resolution wide angle lens system may be preferably satisfied with 0.5<TTL/(IH*2)<1 (herein, TTL represents a thickness from an object side to an image side of the first lens, and IH is an image height).

In addition, the high-resolution wide angle lens system may be preferably provided such that any one of the first lens, the second lens, the third lens, the fourth lens, the fifth lens, and the sixth lens is made of a different material.

According to the present invention, it is possible to provide a high-resolution wide angle lens system in which a total of six lenses are constituted and each lens is designed such that the refractive power is distributed thereto and the shape thereof is set to make the system compact and lightweight while correcting distortion and having a low F-number (2.3 or less).

Further, it is possible to provide a high-resolution wide angle lens system that makes easy the performance reproduction and processing of the system thereby improving productivity, by reducing the refractive power of a fifth lens and thus lowering the sensitivity of the system.

Further, by using the first lens having a high refractive index, it is possible to provide a high-resolution wide angle lens system capable of realizing a wide angle while improving performance at a high-resolution.

BRIEF DESCRIPTION OF THE DRAWINGS

The above and other objects, features and other advantages of the present invention will be more clearly understood from the following.

DETAILED DESCRIPTION OF THE INVENTION

The present invention relates to a lens system consisting of a total of six lenses, the lens system having a first lens, a second lens, a third lens, a fourth lens, a fifth lens, and a sixth lens arranged in this order from an object along an optical axis.

In addition, the present invention provides a high-resolution lens system in which each lens is designed such that the refractive power is distributed thereto and the shape thereof is set to make the system compact and lightweight while correcting distortion and having a low F-number (2.3 or less).

In addition, the present invention provides a high-resolution wide angle lens system that makes easy the performance reproduction and processing of the system thereby improving the productivity, by reducing the refractive power of a fifth lens and thus lowering the sensitivity of the system.

Figure 1:
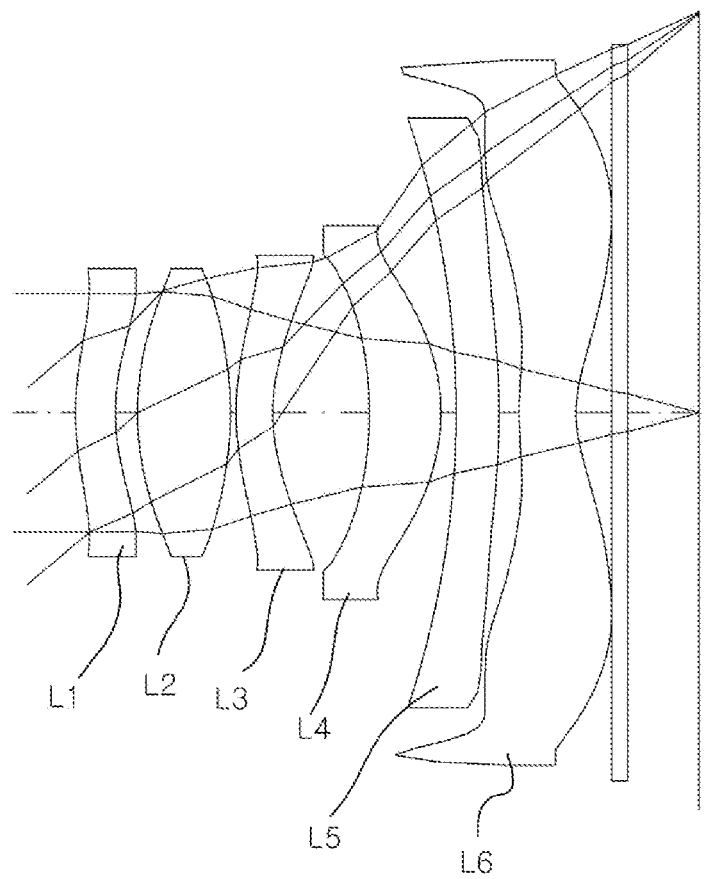
FIG. 1 is a view showing a high-resolution wide angle lens system according to a first embodiment of the present invention.
Figure 2:
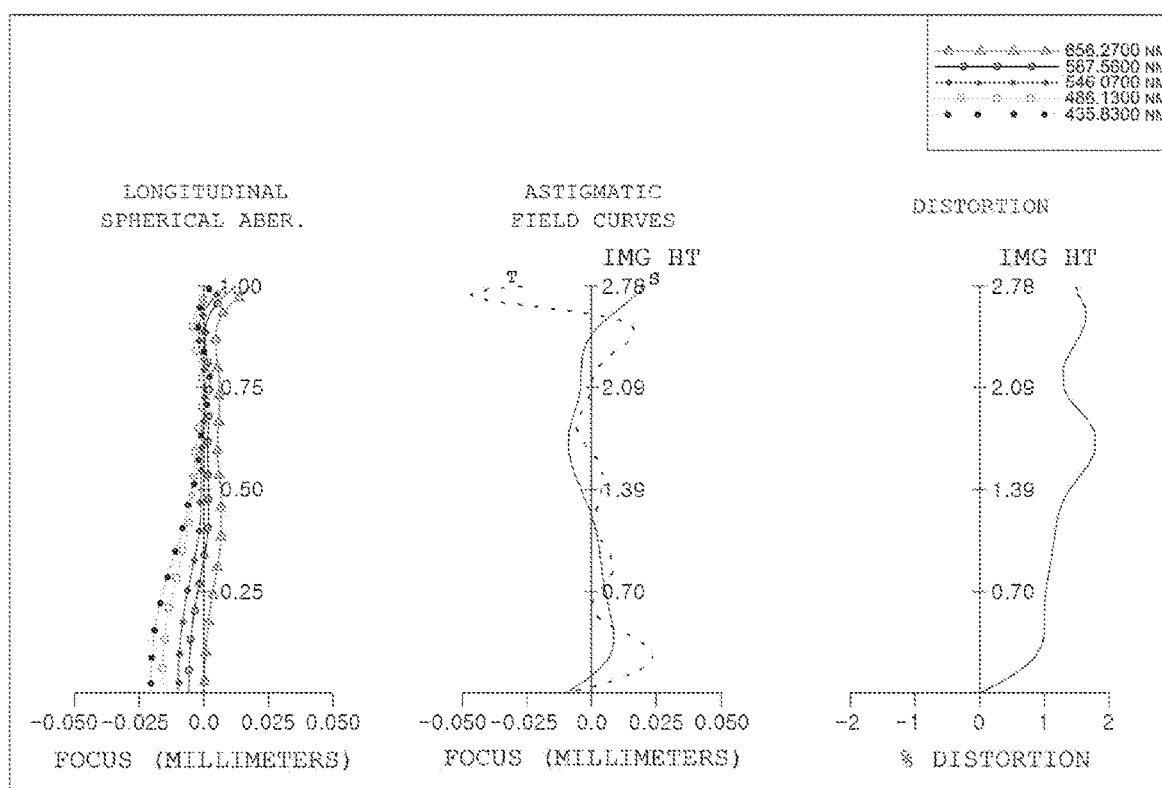
FIG. 2 is a view showing an aberration diagram according to a first embodiment of the present invention.
Figure 3:
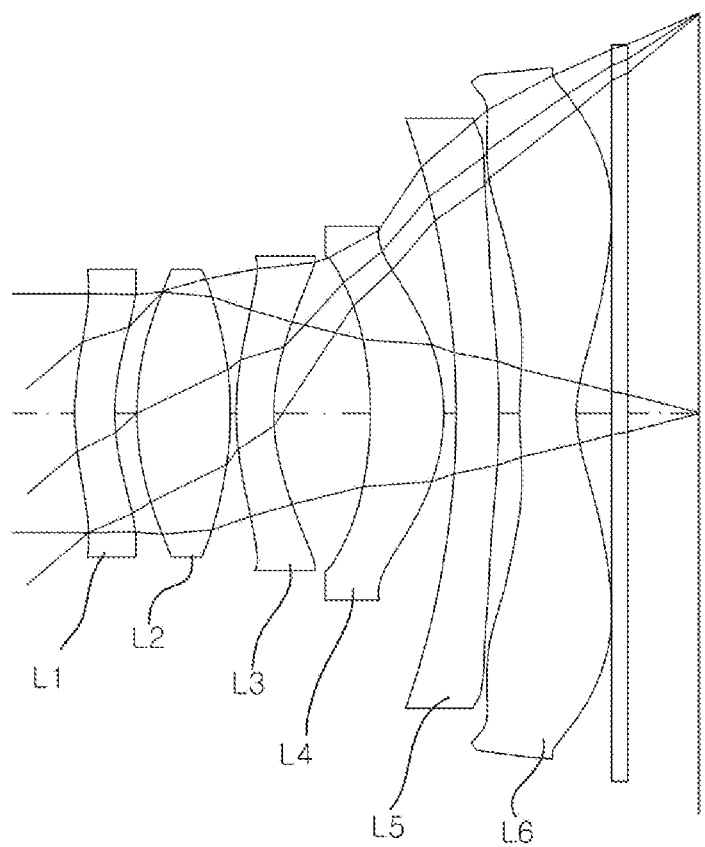
FIG. 3 is a view showing a high-resolution wide angle lens system according to a second embodiment of the present invention.
Figure 4:
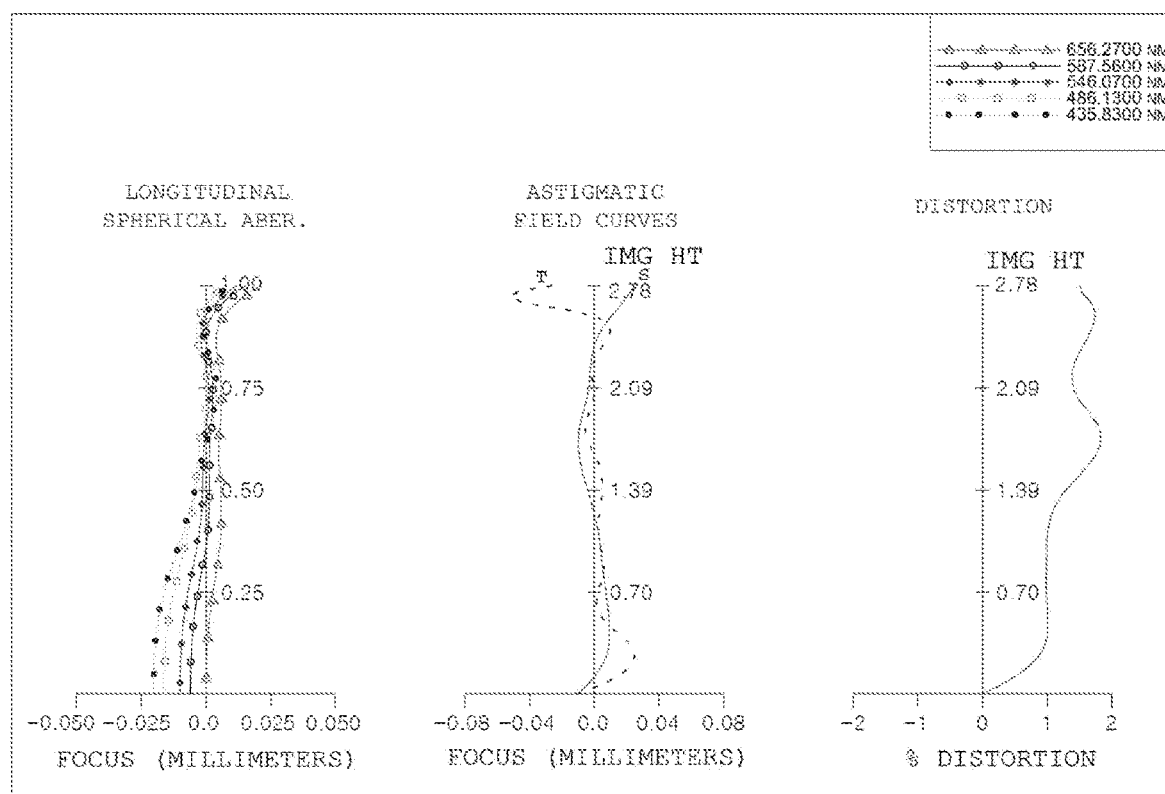
FIG. 4 is a view showing an aberration diagram according to a second embodiment of the present invention.
Figure 5:
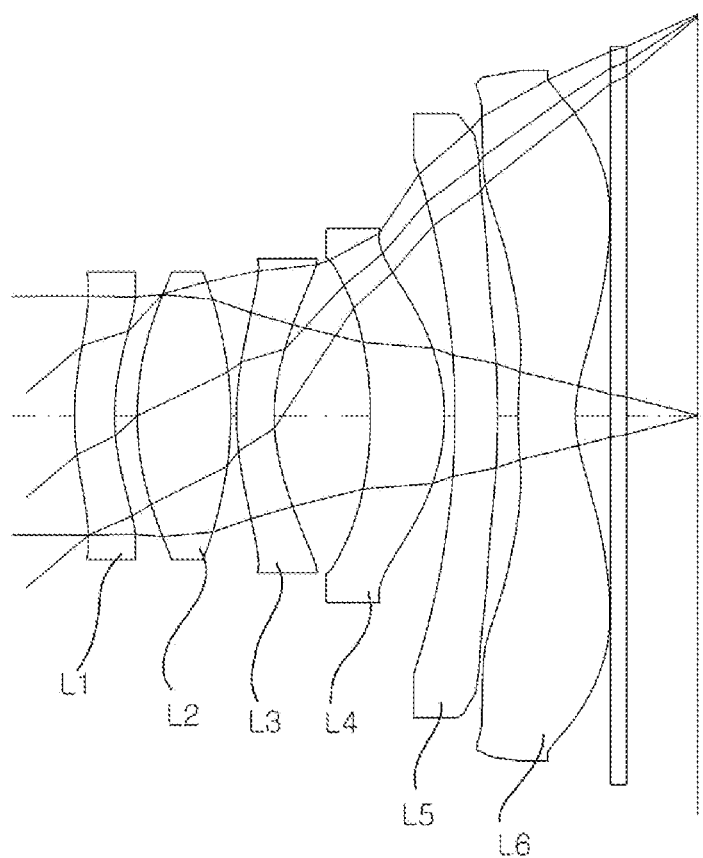
FIG. 5 is a view showing a high-resolution wide angle lens system according to a third embodiment of the present invention.
Figure 6:
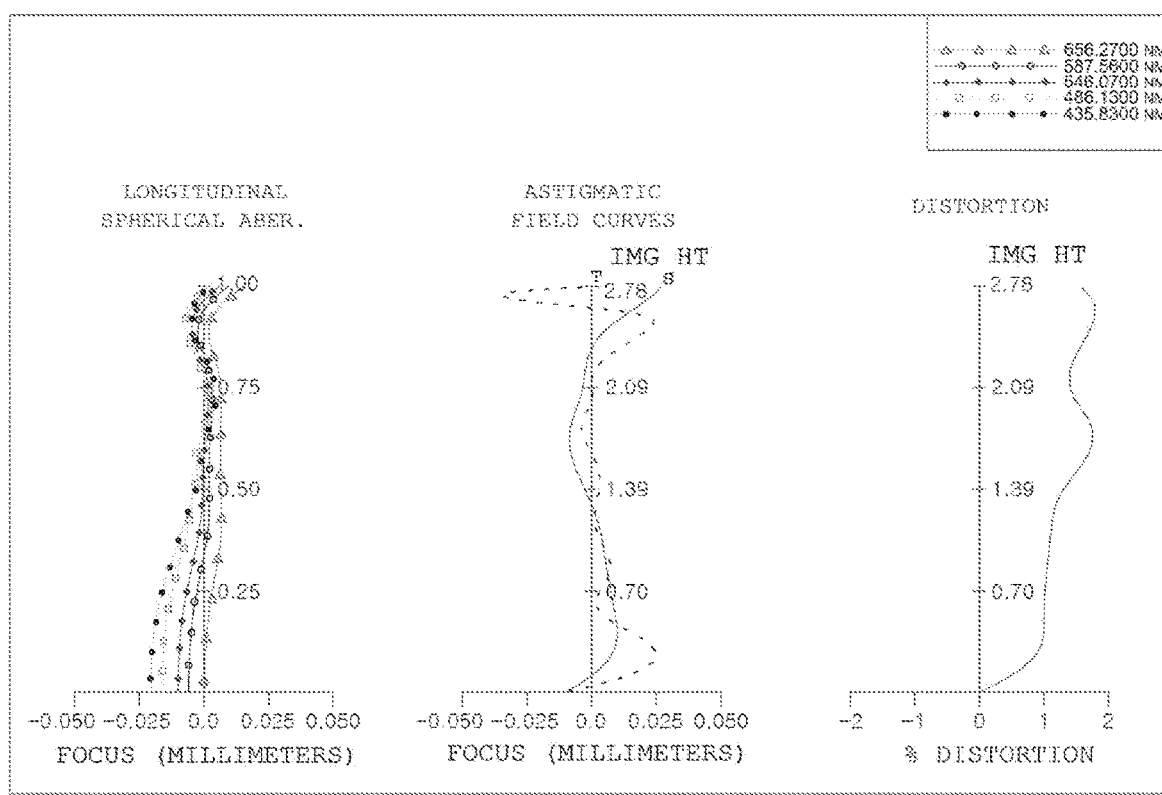
FIG. 6 is a view showing an aberration diagram according to a third embodiment of the present invention.
Figure 7:
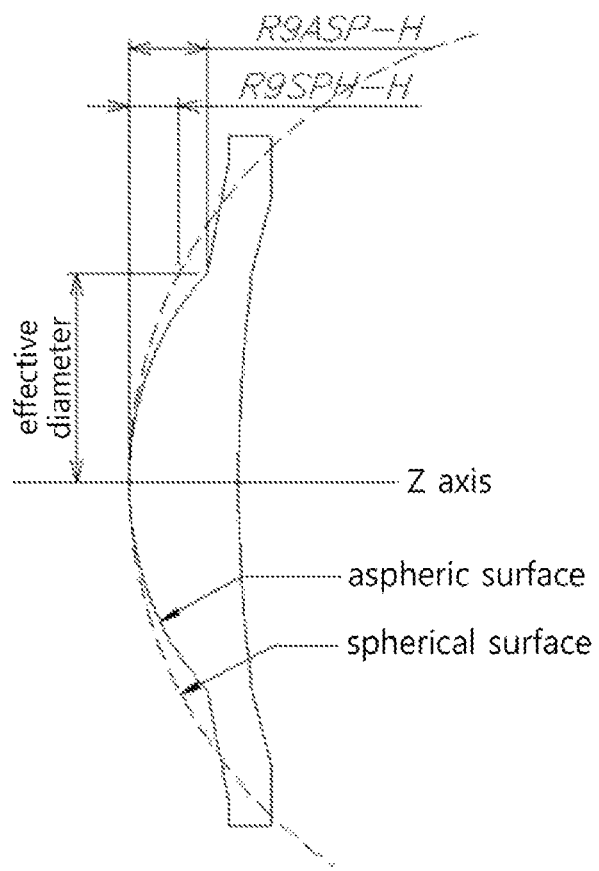
FIG. 7 is a schematic diagram illustrating R9ASP-H and R9SPH-H.

Hereinafter, the present invention will be described in detail with reference to the accompanying drawings. FIG. 1 is a view showing a high-resolution wide angle lens system according to a first embodiment of the present invention, FIG. 2 is a view showing an aberration diagram according to a first embodiment of the present invention, FIG. 3 is a view showing a high-resolution wide angle lens system according to a second embodiment of the present invention, FIG. 4 is a view showing an aberration diagram according to a second embodiment of the present invention, FIG. 5 is a view showing a high-resolution wide angle lens system according to a third embodiment of the present invention, FIG. 6 is a view showing an aberration diagram according to a third embodiment of the present invention, and FIG. 7 is a schematic diagram illustrating R9ASP-H and R9SPH-H.

As shown in drawings, the present invention relates to a high-resolution wide angle lens system, the system comprising a first lens, a second lens, a third lens, a fourth lens, a fifth lens, and a sixth lens arranged in this order from an object along an optical axis, wherein the first lens has a negative refractive power, the second lens has a positive refractive power, the third lens has a positive or negative refractive power, the fourth lens has a positive or negative refractive power, the fifth lens has a positive or negative refractive power with a concave shape on an object side and a convex shape on an image side, and the sixth lens has a positive or negative refractive power, and the system is satisfied with 0<|f/f5|<1 (herein, f represents an effective focal length of an entire lens system, and f5 represents an effective focal length of the fifth lens).

In this way, each lens constituting the lens system according to the present invention is designed such that positive and negative refractive powers are evenly distributed thereto, thereby enabling realization of a high performance suitable for a high-resolution lens system.

In particular, the lens system is configured such that the first lens has a negative refractive power, the second lens has a positive refractive power, the third lens has a positive or negative refractive power, the fourth lens has a positive or negative refractive power, the fifth lens has a concave shape on the object side and a convex shape on the image side and has a positive or negative refractive power, a sixth lens has a positive or negative refractive power, whereby the shape and refractive power are appropriately distributed to the lenses thereby correcting distortion and having a low F number (2.3 or less), whereby a wide angle may be derived while maintaining performance of high-resolution.

In addition, the fifth lens has a concave shape on the object side and a convex shape on the image side and has a positive or negative refractive power, while being satisfied with $0<|f/f5|<1$ (herein, f represents an effective focal length of the entire lens system, and f5 represents an effective focal length of the fifth lens), whereby the refractive power of the fifth lens is lowered and thus the sensitivity of the system is lowered, thereby making easy performance reproduction and processing and thus improving the productivity.

In addition, since a high refractive lens is used as a whole, even when gently-shaping lens that is easily injected is provided, the same refractive power can be obtained, whereby the lens is easy to be machined and the sensitivity is further lowered when the system is applied.

The lens system having the above-mentioned refractive power and shape is provided to be satisfied with $0.9 \leq |R9ASP\text{-}H/R9SPH\text{-}H| \leq 1.1$ (herein, R9ASP-H represents a height from the center of an effective diameter in the case that the effective diameter is for an aspheric surface on the object side of the fifth lens, and R9SPH-H represents a height from the center of an effective diameter in the case that the effective diameter is for a spherical surface R on the object side of the fifth lens).

This represents a ratio of a height from the center of an effective radius in the case that the effective radius is for an aspheric surface on the object side of the fifth lens, to a height from the center of an effective radius in the case that the effective radius is for a spherical surface R on the object side of the fifth lens, thereby reducing the sensitivity of the assembly tilt to the object side of the fifth lens.

The lens system having the above-mentioned refractive power and shape is provided to be satisfied with $|R10/R9|>0.5$ (herein, R9 represents a curvature radius on the object side of the fifth lens, and R10 represents a curvature radius on the image side of the fifth lens).

This is to design the curvature radius in the fifth lens, which prevents refractive power from being concentrated on R9, thereby further lowering the sensitivity of the lens system.

That is, the fifth lens is provided to have a concave shape on the object side and a convex shape on the image side with having a positive or negative refractive power, and to have the curvature radius R9 on the object side and the curvature radius R10 on the image side, thereby lowering the sensitivity during injection molding and alleviating the assembly tolerance of the system, and thus making easy performance reproduction and processing and thus improving the productivity.

Further, the lens system according to the present invention is provided to be satisfied with $R10/f<-1.5$ (herein, R10 represents a curvature radius on the image side of the fifth lens and f represents an effective focal length of the entire lens system).

This is to design the curvature radius of the fifth lens, and as a value of R10 increases in a negative direction, the sensitivity to the eccentricity may be further lowered, thereby further improving the performance reproduction and processing of the system.

Further, the lens system according to the present invention is provided to be satisfied with N1>N2 (herein, N1 is a refractive index of the first lens, and N2 is a refractive index of the second lens).

This makes it possible to easily derive the wide angle by using a lens having a high refractive index for the first lens, thereby providing a high-resolution wide angle lens system.

Further, the lens system according to the present invention is provided to be satisfied with $1<TTL/f<2$ (herein, TTL represents a thickness from the object side to the image side of the first lens, and f represents an effective focal length of the entire lens system).

This makes it possible to secure an angle of incidence of the principal ray on a sensor surface because the focal length may be shortened due to the wide angle lens system, whereby it is advantageous to design the wide angle.

Further, the lens system according to the present invention is provided to be satisfied with $0.5<TTL/(IH*2)<1$ (herein, TTL is a thickness from the object side to the image side of the first lens, and IH is an image height).

This makes it possible to constitute an optical system smaller than the size of the image surface (sensor surface) thereby making the optical system compact.

Further, the lens system according to the present invention is provided such that any one of the first lens, the second lens, the third lens, the fourth lens, the fifth lens, and the sixth lens is made of a different material.

That is, in order to correct the spherical aberration, it is preferable that each lens is formed with at least one surface being an aspheric surface. The glass and plastic materials are appropriately mixed to constitute the lens, thereby correcting the chromatic aberration. In addition, each lens is used with a material having a high refractive index in order to reduce the length thereof and also is used with a material having different Abbe number in order to correct the chromatic aberration.

As described above, the conditions of shapes and materials of the first lens, the second lens, the third lens, the fourth lens, the fifth lens, and the sixth lens are provided to minimize spherical aberration, coma aberration, surface curvature, and distortion aberration, thereby improving the performance of the optical system and making the entire optical system compact.

Hereinafter, preferred embodiments of the present invention will be described.

First Embodiment

FIG. 1 is a view showing a high-resolution wide angle lens system according to a first embodiment of the present invention.

As shown in the FIG. 1, a first lens L1, a second lens L2, a third lens L3, a fourth lens L4, a fifth lens L5, and a sixth lens L6 are arranged in this order from an object along an optical axis.

Table 1 below shows numerical data of the lenses constituting an optical system according to the first embodiment of the present invention.

TABLE 1

| | | Curvature Radius (mm) | Thickness (mm) | Refractive Index | Abbe Number | Effective Focal Length |
|---|---|---|---|---|---|---|
| L1 | R1 | 2.036498 | 0.280083 | 1.6610 | 20.4 | −13.210 |
| | R2 | 1.563711 | 0.155010 | | | |

TABLE 1-continued

| | | Curvature Radius (mm) | Thickness (mm) | Refractive Index | Abbe Number | Effective Focal Length |
|---|---|---|---|---|---|---|
| L2 | R3 | 2.156047 | 0.650665 | 1.5441 | 56.0 | 2.138 |
| | R4 | -2.277272 | 0.040000 | | | |
| L3 | R5 | 2.057536 | 0.256566 | 1.6350 | 239.0 | -13.210 |
| | R6 | 1.352514 | 0.676213 | | | |
| L4 | R7 | -2.686387 | 0.502556 | 1.5441 | 56.0 | 4.672 |
| | R8 | -1.395504 | 0.106583 | | | |
| L5 | R9 | -6.358536 | 0.300000 | 1.5441 | 56.0 | 267.620 |
| | R10 | -6.195158 | 0.140730 | | | |
| L6 | R11 | 2.217051 | 0.400000 | 1.5350 | 56.0 | -3.128 |
| | R12 | 0.895689 | 0.251593 | | | |
| | Filter | 1.00E+18 | 0.11 | BSC7 | | |
| | | 1.00E+18 | 0.490035 | | | |

As shown in FIG. 1, when the first lens L1, the second lens L2, the third lens L3, the fourth lens L4, the fifth lens L5, and the sixth lens L5 are arranged from an object side, assuming that a direction of the optical axis is X and a direction perpendicular to the optical axis is Y, an aspheric surface equation is as follows.

$$X(Y) = \frac{Y^2}{R} \frac{1}{1 + \sqrt{1 - (1+K)\left(\frac{Y}{R}\right)^2}} + A_3 Y^4 + A_4 Y^6 + A_5 Y^8 + A_6 Y^{10} + \ldots + A_{14} Y^{26}$$ [Equation 1]

The aspheric surface is a curved surface obtained by rotating a curve obtained by the aspheric surface equation of the Equation 1 about the optical axis, R is a curvature radius, K is a conical constant, and $A_3, A_4, A_5, A_6, \ldots, A_{14}$ are aspheric surface coefficients.

The aspheric surface coefficients having data of each lens from the above Equation 1 are shown in Table 2 below.

TABLE 2

| | | K | A3 | A4 | A5 | A6 | A7 | A8 | A9 | A10 | A11 | A12 |
|---|---|---|---|---|---|---|---|---|---|---|---|---|
| L1 | R1 | 2.036 | -13.727 | 0.081 | -0.353 | 0.155 | 1.017 | -3.539 | 5.932 | -5.629 | 2.865 | -0.602 |
| | R2 | 1.564 | -2.446 | -0.012 | -0.316 | 0.342 | -0.059 | -0.851 | 2.356 | -3.006 | 1.884 | -0.453 |
| L2 | R3 | 2.156 | 2.464 | 0.059 | -0.308 | 1.014 | -3.470 | 7.289 | -8.751 | 5.391 | -1.149 | -0.149 |
| | R4 | -2.277 | -0.299 | 0.213 | -0.987 | 3.211 | -6.735 | 8.833 | -6.786 | 2.460 | -1.011 | -0.173 |
| L3 | R5 | 2.058 | 2.277 | -0.019 | -0.769 | 2.397 | -5.073 | 7.292 | -6.913 | 3.975 | -1.189 | 0.117 |
| | R6 | 1.353 | -1.164 | -0.135 | 0.147 | -0.640 | 1.891 | -3.166 | 3.228 | -2.027 | 0.732 | -0.123 |
| L4 | R7 | -2.686 | 4.698 | -0.037 | 0.510 | -2.925 | 9.289 | -18.049 | 21.880 | -16.017 | 6.490 | -1.122 |
| | R8 | -1.396 | -1.248 | -0.138 | 0.767 | -2.673 | 5.700 | -7.649 | -6.460 | -3.283 | 0.911 | -0.105 |
| L5 | R9 | -6.359 | | | | | | | | | | |
| | R10 | -6.195 | -5.078 | -0.050 | 0.121 | -0.083 | 0.040 | -0.029 | 0.017414 | -0.005753 | 0.000935 | -0.000059 |
| L6 | R11 | 2.217 | -85.939 | -0.276 | 0.049 | 0.341 | -0.437 | 0.255 | -0.082760 | 0.015345 | -0.001522 | 0.000063 |
| | R12 | 0.896 | -6.493 | -0.133 | 0.064 | -0.006 | -0.007 | 0.002 | 0.000328 | -0.000192 | 0.000028 | 0.000001 |

The lens system is satisfied with R9ASP-H/R9SPH-H=1 (herein, R9ASP-H represents a height from the center of an effective diameter in the case that the effective diameter is for an aspheric surface on the object side of the fifth lens, and R9SPH-H represents a height from the center of an effective diameter in the case that the effective diameter is for a spherical surface R on the object side of the fifth lens). (The aspheric surface coefficient on the object side surface of the fifth lens=0).

Table 3 shows a thickness (TTL) from the object side to the image surface of the first lens, an effective focal length of each lens, and an effective focal length f of the entire lens system.

TABLE 3

| TTL | 4.370 |
|---|---|
| f1 | -13.210 |
| f2 | 2.138 |
| f3 | -13.210 |
| f4 | 4.672 |
| f5 | 267.620 |
| f6 | -3.128 |
| f | 3.234 |

Table 4 shows a ratio of the effective focal length of each lens to the effective focal length of the entire lens system, and an image height (IH).

TABLE 4

| f1/f | -4.085 |
|---|---|
| f2/f | 0.661 |
| f3/f | -4.085 |
| f4/f | 1.445 |
| f5/f | 82.749 |

TABLE 4-continued

| f6/f | -0.967 |
|---|---|
| IH | 2.782 |

Table 5 below shows (R10/f) (herein, R10 represents a curvature radius on the image side of the fifth lens, f represents an effective focal length of the entire lens system), TTL/f (herein, TTL represents a thickness from the object side to the image side of the first lens, and f represents an effective focal length of the entire lens system), TTL/IH*2 (herein, TTL represents a thickness from the object side to the image side of the first lens, and IH represents an image height), (f1+f2)/(f1−f2) (herein, f1 is a focal length of the first lens, f2 indicated a focal length of the second lens), f/f5 (herein, f represents an effective focal length of the entire lens system, and f5 represents a focal length of the fifth lens), f/f2 (herein, f represents an effective focal length of the entire lens system, and f2 represents a focal length of the second lens), |R10/R9| (herein, R9 represents a curvature radius on the object side of the fifth lens, and R10 represents a curvature radius on the image side of the fifth lens).

TABLE 5

| | |
|---|---|
| R10/f | −1.916 |
| TTL/f | 1.351226 |
| TTL/2*IH | 0.785406 |
| (f1 + f2)/(f1 − f2) | 0.721397 |
| f/f5 | 0.012085 |
| f/f2 | 1.512675 |
| |R10/R9| | 0.974306 |

FIG. 2 is a view showing an aberration diagram according to the first embodiment of the present invention.

The first data in FIG. 2 shows a spherical aberration, in which a horizontal axis represents a focus (mm), and a vertical axis represents an image height (mm), and each graph represents the wavelength of the incident light. As shown, it is known that the closer the graphs are to the central vertical axis line and the closer to each other, the better the correction of spherical aberration is, and the spherical aberration according to the first embodiment of the present invention is determined to be preferably 0.025 mm (focus) or less.

The second data in FIG. 2 shows an astigmatism aberration, in which a horizontal axis represents a focus (mm) and a vertical axis represents an image height (mm). The graph S represents a sagittal ray, which is a ray incident in the horizontal direction to the lens, the graph T represents a tangential ray, which is a ray incident in a direction perpendicular to the lens. Here, it is known that the closer to the graphs S and T, and the closer to the central vertical axis, the better the correction of astigmatism aberration. It is determined that the astigmatism aberration of the first embodiment according to the present invention is preferably 0.025 mm (focus) or less.

The third data in FIG. 2 shows distortion aberration, in which a horizontal axis represents a degree of distortion (%) and a vertical axis represents an image height (mm). It is generally known to be better when the aberration curve falls within a range of −2 to 2%. An optical distortion as the distortion aberration according to the first embodiment of the present invention is determined to be preferably 2% or less.

Second Embodiment

FIG. 3 is a view showing a high-resolution wide angle lens system according to a second embodiment of the present invention.

As shown in the FIG. 3, a first lens L1, a second lens L2, a third lens L3, a fourth lens L4, a fifth lens L5, and a sixth lens L6 are arranged in this order from an object along an optical axis.

Table 6 shows numerical data of the lenses constituting an optical system according to the second embodiment of the present invention.

TABLE 6

| | | Curvature Radius (mm) | Thickness (mm) | Refractive Index | Abbe Number | Effective Focal Length |
|---|---|---|---|---|---|---|
| L1 | R1 | 2.031379 | 0.280000 | 1.6610 | 20.4 | −13.179 |
| | R2 | 1.559645 | 0.175872 | | | |
| L2 | R3 | 2.147950 | 0.653069 | 1.5441 | 56.0 | 2.123 |
| | R4 | −2.251004 | 0.040000 | | | |
| L3 | R5 | 2.071878 | 0.262744 | 1.6350 | 23.9 | −7.016 |
| | R6 | 1.348321 | 0.677188 | | | |
| L4 | R7 | −2.692470 | 0.514437 | 1.5441 | 56.0 | 4.430 |
| | R8 | −1.360659 | 0.086147 | | | |
| L5 | R9 | −6.138113 | 0.300000 | 1.5441 | 56.0 | −172.893 |
| | R10 | −6.678008 | 0.142816 | | | |
| L6 | R11 | 2.224245 | 0.400000 | 1.5350 | 56.0 | −3.079 |
| | R12 | 0.889034 | 0.247573 | | | |
| | Filter | 1.00E+18 | 0.11 | BSC7_HOYA | | |
| | | 1.00E+18 | 0.49004 | | | |

As shown in FIG. 3, when the first lens L1, the second lens L2, the third lens L3, the fourth lens L4, the fifth lens L5, and the sixth lens L5 are arranged in this order from an object side, assuming that a direction of an optical axis is X and a direction perpendicular to the optical axis is Y, an aspheric surface equation is expressed as in the above Equation 1.

The aspheric surface is a curved surface obtained by rotating a curve obtained by the aspheric surface equation of the Equation 1 about the optical axis, R is a curvature radius, K is a conical constant, and $A_3$, $A_4$, $A_5$, $A_6$, ..., $A_{14}$ are aspheric surface coefficients.

The aspheric surface coefficients having data of each lens from the above Equation 1 are shown in Table 7 below.

TABLE 7

| | | K | A3 | A4 | A5 | A6 | A7 | A8 | A9 | A10 | A11 | A12 |
|---|---|---|---|---|---|---|---|---|---|---|---|---|
| L1 | R1 | 2.031 | −13.525 | 0.080 | −0.354 | 0.155 | 1.017 | −3.539 | 5.932 | −5.629 | 2.865 | −0.602 |
| | R2 | 1.560 | −2.413 | −0.011 | −0.316 | 0.341 | −0.057 | −0.851 | 2.356 | −3.005 | 1.884 | −0.453 |

TABLE 7-continued

|  |  | K | A3 | A4 | A5 | A6 | A7 | A8 | A9 | A10 | A11 | A12 |
|---|---|---|---|---|---|---|---|---|---|---|---|---|
| L2 | R3 | 2.148 | 2.458 | 0.060 | −0.307 | 1.015 | −3.470 | 7.289 | −8.751 | 5.391 | −1.149 | −0.149 |
|  | R4 | −2.251 | −0.304 | 0.213 | −0.985 | 3.212 | −6.735 | 8.833 | −6.786 | 2.460 | −0.011 | −0.173 |
| L3 | R5 | 2.072 | 2.272 | −0.017 | −0.768 | 2.396 | −5.071 | 7.292 | −6.913 | 3.975 | −1.189 | 0.117 |
|  | R6 | 1.348 | −1.141 | −0.134 | 0.147 | −0.640 | 1.891 | −3.167 | 3.228 | −2.027 | 0.732 | −0.123 |
| L4 | R7 | −2.682 | 4.686 | −0.037 | 0.509 | −2.325 | 9.289 | −18.048 | 21.880 | −16.017 | 6.490 | −1.122 |
|  | R8 | −1.361 | −1.299 | −0.136 | 0.766 | −2.674 | 5.700 | −7.648 | 6.460 | −3.283 | 0.911 | −0.105 |
| L5 | R9 | −6.138 |  |  |  |  |  |  |  |  |  |  |
|  | R10 | −6.678 | −5.189 | −0.056 | 0.111 | −0.036 | −0.020 | 0.011 | 0.001462 | −0.001894 | 0.000420 | −0.000031 |
| L6 | R11 | 2.224 | −86.175 | −0.312 | 0.121 | 0.273 | −0.396 | 0.236 | −0.076626 | 0.014192 | −0.001407 | 0.000058 |
|  | R12 | 0.889 | −6.495 | −0.153 | 0.095 | −0.030 | 0.006 | −0.003 | 0.001399 | −0.000347 | 0.000040 | −0.000002 |

The lens system is satisfied with R9ASP-H/R9SPH-H=1 (herein, R9ASP-H represents a height from the center of an effective diameter in the case that the effective diameter is for an aspheric surface on the object side of the fifth lens, and R9SPH-H represents a height from the center of an effective diameter in the case that the effective diameter is for a spherical surface R on the object side of the fifth lens). (The aspheric surface coefficient on the object side surface of the fifth lens=0).

Table 8 shows a thickness (TTL) from an object side to an image surface of the first lens, an effective focal length of each lens, and an effective focal length (f) of the entire lens system.

TABLE 8

| TTL | 4.370 |
|---|---|
| f1 | −13.179 |
| f2 | 2.123 |
| f3 | −7.016 |
| f4 | 4.430 |
| f5 | −172.893 |
| f6 | −3.079 |
| F | 3.234 |

Table 9 below shows a ratio of the effective focal length of each lens to the effective focal length of the entire lens system, and an image height (IH).

TABLE 9

| f1/f | −4.075 |
|---|---|
| f2/f | 0.656 |
| f3/f | −2.169 |
| f4/f | 1.370 |
| f5/f | −53.459 |
| f6/f | −0.952 |
| IH | 2.782 |

Table 10 below shows (R10/f) (herein, R10 represents a curvature radius on the image side of the fifth lens, f represents an effective focal length of the entire lens system), TTL/f (herein, TTL represents a thickness from the object side to the image side of the first lens, and f represents the effective focal length of the entire lens system), TTL/IH*2 (herein, TTL represents a thickness from the object side to the image side of the first lens, and IH represents an image height), (f1+f2)/(f1−f2) (herein, f1 is a focal length of the first lens, f2 represents a focal length of the second lens), f/f5 (herein, f represents an effective focal length of the entire lens system, and f5 represents a focal length of the fifth lens), f/f2 (herein, f represents an effective focal length of the entire lens system, and f2 represents a focal length of the second lens), |R10/R9| (herein, R9 represents a curvature radius on the object side of the fifth lens, and R10 represents a curvature radius on the image side of the fifth lens).

TABLE 10

| R10/f | −2.065 |
|---|---|
| TTL/f | 1.351226 |
| TTL/2*IH | 0.785406 |
| (f1 + f2)/(f1 − f2) | 0.72252 |
| f/f5 | −0.01871 |
| f/f2 | 1.523363 |
| |R10/R9| | 1.087958 |

FIG. 4 shows an aberration diagram according to a second embodiment of the present invention.

The first data in FIG. 4 shows a spherical aberration, in which a horizontal axis represents a focus (mm), and a vertical axis represents an image height (mm), and each graph represents the wavelength of the incident light. As shown, it is known that the closer the graphs are to the central vertical axis line and the closer to each other, the better the correction of spherical aberration is, and the spherical aberration according to the second embodiment of the present invention is determined to be preferably 0.025 mm (focus) or less.

The second data in FIG. 4 shows an astigmatism aberration, in which a horizontal axis represents a focus (mm) and a vertical axis represents an image height (mm). The graph S represents a sagittal ray, which is a ray incident in the horizontal direction to the lens, the graph T represents a tangential ray, which is a ray incident in a direction perpendicular to the lens. Here, it is known that the closer to the graphs S and T, and the closer to the central vertical axis, the better the correction of astigmatism aberration. It is determined that the astigmatism aberration of the second embodiment according to the present invention is preferably 0.025 mm (focus) or less.

The third data in FIG. 4 shows distortion aberration, in which a horizontal axis represents a degree of distortion (%) and a vertical axis represents an image height (mm). It is generally known to be better when the aberration curve falls within a range of −2 to 2%. An optical distortion as the distortion aberration according to the second embodiment of the present invention is determined to be preferably 2% or less.

Third Embodiment

FIG. 5 is a view showing a high-resolution wide angle lens system according to a third embodiment of the present invention.

As shown in FIG. 5, a first lens L1, a second lens L2, a third lens L3, a fourth lens L4, a fifth lens L5, and a sixth lens L6 are arranged in this order from an object along an optical axis.

Table 11 below shows numerical data of the lenses constituting an optical system according to the third embodiment of the present invention.

TABLE 11

|    |     | Curvature Radius (mm) | Thickness (mm) | Refractive Index | Abbe Number | Effective Focal Length |
|----|-----|-----------------------|----------------|------------------|-------------|------------------------|
| L1 | R1  | 2.021                 | 0.280          | 1.6610           | 20.4        | −13.155                |
|    | R2  | 1.552                 | 0.160          |                  |             |                        |
| L2 | R3  | 2.140                 | 0.655          | 1.5441           | 56.0        | 2.119                  |
|    | R4  | −2.251                | 0.040          |                  |             |                        |
| L3 | R5  | 2.066                 | 0.265          | 1.6350           | 23.9        | −7.048                 |
|    | R6  | 1.347                 | 0.675          |                  |             |                        |
| L4 | R7  | −2.696                | 0.519          | 1.5441           | 56.0        | 4.352                  |
|    | R8  | −1.349                | 0.073          |                  |             |                        |
| L5 | R9  | −5.739                | 0.300          | 1.5441           | 56.0        | −108.253               |
|    | R10 | −6.473                | 0.143          |                  |             |                        |
| L6 | R11 | 2.214                 | 0.401          | 1.5350           | 56.0        | −3.068                 |
|    | R12 | 0.885                 | 0.248          |                  |             |                        |
|    | Filter |                    | 0.110          | BSC7_HOYA        |             |                        |
|    |     |                       | 0.490          |                  |             |                        |

As shown in FIG. 5, when the first lens L1, the second lens L2, the third lens L3, the fourth lens L4, the fifth lens L5, and the sixth lens L5 are arranged in this order from an object side, assuming that a direction of the optical axis is X and a direction perpendicular to the optical axis is Y, an aspheric surface equation is expressed as in the above Equation 1.

The aspheric surface is a curved surface obtained by rotating a curve obtained by the aspheric surface expression of the Equation 1 about the optical axis, R is a curvature radius, K is a conical constant, and $A_3, A_4, A_5, A_6, \ldots, A_{14}$ are aspheric surface coefficients.

The aspheric surface coefficients having data of each lens from the above Equation 1 are shown in Table 12 below.

TABLE 12

|    |     | K      | A3      | A4     | A5     | A6     | A7     | A8      | A9     | A10     | A11    | A12       |
|----|-----|--------|---------|--------|--------|--------|--------|---------|--------|---------|--------|-----------|
| L1 | R1  | 2.021  | −13.375 | 0.081  | −0.354 | 0.154  | 1.016  | −3.539  | 5.932  | −5.629  | 2.865  | −0.602    |
|    | R2  | 1.552  | −2.375  | −0.011 | −0.317 | 0.340  | −0.060 | −0.851  | 2.356  | −3.005  | 1.884  | −0.453    |
| L2 | R3  | 2.140  | 2.417   | 0.061  | −0.308 | 1.014  | −3.470 | 7.289   | −8.751 | 5.391   | −1.149 | −0.149    |
|    | R4  | −2.251 | −0.325  | 0.213  | −0.984 | 3.212  | −6.732 | 8.833   | −6.786 | 2.460   | −0.011 | −0.173    |
| L3 | R5  | 2.066  | 2.259   | −0.014 | −0.767 | 2.397  | −5.070 | 7.293   | −6.913 | 3.975   | −1.189 | 0.117     |
|    | R6  | 1.347  | −1.111  | −0.133 | 0.148  | −0.639 | 1.891  | −3.166  | 3.228  | −2.027  | 0.732  | −0.123    |
| L4 | R7  | −2.696 | 4.683   | −0.034 | 0.509  | −2.925 | 9.289  | −18.049 | 21.880 | −16.017 | 6.490  | −1.122    |
|    | R8  | −1.349 | −1.333  | −0.136 | 0.766  | −2.674 | 5.700  | −7.649  | 6.460  | −3.283  | 0.911  | −0.105    |
| L5 | R9  | −5.739 |         |        |        |        |        |         |        |         |        |           |
|    | R10 | −6.473 | −4.721  | −0.056 | 0.108  | 0.0030 | −0.027 | 0.016   | −0.00719 | −0.001246 | 0.000310 | −0.000023 |
| L6 | R11 | 2.214  | −86.175 | −0.307 | 0.103  | 0.291  | −0.397 | 0.230   | −0.072799 | 0.013114 | −0.001263 | 0.000051 |
|    | R12 | 0.885  | −6.498  | −0.150 | 0.094  | −0.036 | 0.013  | −0.007  | 0.002486 | −0.000530 | 0.000057 | −0.000002 |

The lens system is satisfied with R9ASP-H/R9SPH-H=1 (herein, R9ASP-H represents a height from the center of an effective diameter in the case that the effective diameter is for an aspheric surface on the object side of the fifth lens, and R9SPH-H represents a height from the center of an effective diameter in the case that the effective diameter is for a spherical surface R on the object side of the fifth lens). (The aspheric surface coefficient on the object side surface of the fifth lens=0).

Table 13 shows a thickness (TTL) from an object side to an image surface of the first lens, an effective focal length of each lens, and an effective focal length (f) of the entire lens system.

TABLE 13

| TTL | 4.370   |
|-----|---------|
| f1  | −13.155 |
| f2  | 2.119   |

TABLE 13-continued

| f3 | −7.048   |
|----|----------|
| f4 | 4.352    |
| f5 | −108.253 |
| f6 | −3.068   |
| f  | 3.230    |

Table 14 below shows a ratio of the effective focal length of each lens to the effective focal length of the entire lens system, and an image height (IH).

TABLE 14

| f1/f | −4.073  |
|------|---------|
| f2/f | 0.656   |
| f3/f | −2.182  |
| f4/f | 1.347   |
| f5/f | −33.518 |
| f6/f | −0.950  |
| IH   | 2.782   |

Table 15 below shows (R10/f) (herein, R10 represents a curvature radius on the image side of the fifth lens, f represents an effective focal length of the entire lens system), TTL/f (herein, TTL represents a thickness from the object side to the image side of the first lens, and f represents an effective focal length of the entire lens system), TTL/IH*2 (herein, TTL represents a thickness from the object side to the image side of the first lens, and IH represents an image height), (f1+f2)/(f1−f2) (herein, f1 is a focal length of the first lens, f2 indicated a focal length of the second lens), f/f5 (herein, f represents an effective focal length of the entire lens system, and f5 represents a focal length of the fifth lens), f/f2 (herein, f represents an effective focal length of the entire lens system, and f2 represents a focal length of the second lens), |R10/R9| (herein, R9 represents a curvature radius on the object side of the fifth lens, and R10 represents a curvature radius on the image side of the fifth lens).

TABLE 15

| | |
|---|---|
| R10/f | −2.004 |
| TTL/f | 1.353067 |
| TTL/2*IH | 0.785406 |
| (f1 + f2)/(f1 − f2) | 0.722535 |
| f/f5 | −0.02983 |
| f/f2 | 1.524162 |
| |R10/R9| | 1.127901 |

FIG. 6 is a view showing an aberration diagram according to a third embodiment of the present invention.

The first data in FIG. 6 shows a spherical aberration, in which a horizontal axis represents a focus (mm), and a vertical axis represents an image height (mm), and each graph represents the wavelength of the incident light. As shown, it is known that the closer the graphs are to the central vertical axis line and the closer to each other, the better the correction of spherical aberration is, and the spherical aberration according to the third embodiment of the present invention is determined to be preferably 0.025 mm (focus) or less.

The second data in FIG. 6 shows an astigmatism aberration, in which a horizontal axis represents a focus (mm) and a vertical axis represents an image height (mm). The graph S represents a sagittal ray, which is a ray incident in the horizontal direction to the lens, the graph T represents a tangential ray, which is a ray incident in a direction perpendicular to the lens. Here, it is known that the closer to the graphs S and T, and the closer to the central vertical axis, the better the correction of astigmatism aberration. It is determined that the astigmatism aberration of the third embodiment according to the present invention is preferably 0.025 mm (focus) or less.

The third data in FIG. 6 shows distortion aberration, in which a horizontal axis represents a degree of distortion (%) and a vertical axis represents an image height (mm). It is generally known to be better when the aberration curve falls within a range of −2 to 2%. An optical distortion as the distortion aberration according to the third embodiment of the present invention is determined to be preferably 2% or less.

The invention claimed is:

1. A high-resolution wide angle lens system, the system comprising a first lens, a second lens, a third lens, a fourth lens, a fifth lens, and a sixth lens arranged in this order from an object along an optical axis, wherein the first lens has a negative refractive power, the second lens has a positive refractive power, the third lens has a positive or negative refractive power, the fourth lens has a positive or negative refractive power, the fifth lens has a positive or negative refractive power with a concave shape on an object side and a convex shape on an image side, and the sixth lens has a positive or negative refractive power, and the system is satisfied with 0<|f/f5|<1, wherein f represents an effective focal length of the entire lens system, and f5 represents an effective focal length of the fifth lens, wherein an aspheric surface of the fifth lens on the object side is obtained by rotating a curve obtained by the following equation about the optical axis:

$$X(Y) = \frac{Y^2}{R} \frac{1}{1 + \left(\sqrt{1 - (1+K)\left(\frac{Y}{R}\right)^2}\right)} +$$

$$A_3 Y^4 + A_4 Y^6 + A_5 Y^8 + A_6 Y^{10} + \ldots + A_{14} Y^{26}$$

wherein, a direction of the optical axis is X, a direction perpendicular to the optical axis is Y, R is a curvature radius, K is a conical constant, and $A_3$, $A_4$, $A_5$, $A_6$, ..., $A_{14}$ are aspheric surface coefficients wherein the lens system is satisfied with 0.9≤|R9ASP-H/R9SPH-H|≤1.1 wherein, R9ASP-H represents a first distance from a first point on the object side of the fifth lens to a virtual plane tangential to a center of the fifth lens on the object side of the fifth lens, and R9SPH-H represents a second distance from a second point on a virtual spherical surface to the virtual plane, the first point and the second point being distanced from the optical axis by an effective diameter of the fifth lens, and the virtual spherical surface having a radius of the curvature radius R and being passing through the center of the fifth lens and tangential to the virtual plane.

2. The system of claim 1, wherein the lens system is satisfied with |R10/R9|>0.5 wherein, R9 represents a curvature radius on the object side of the fifth lens, and R10 represents a curvature radius on the image side of the fifth lens.

3. The system of claim 1, wherein the lens system is satisfied with R10/f<−1.5 wherein, R10 represents a curvature radius on the image side of the fifth lens, and f represents the effective focal length of the entire lens system.

4. The system of claim 1, wherein the lens system is satisfied with N1>N2 wherein, N1 is a refractive index of the first lens, and N2 is a refractive index of the second lens.

5. The system of claim 1, wherein the lens system is satisfied with 1<TTL/f<2 wherein, TTL represents a thickness from an object side to an image side of the first lens, and f represents the effective focal length of the entire lens system.

6. The system of claim 1, wherein the lens system is satisfied with 0.5<TTL/(IH*2)<1 wherein, TTL represents a thickness from an object side to an image side of the first lens, and IH is an image height.

7. The system of claim 1, wherein the lens system is provided such that any one of the first lens, the second lens, the third lens, the fourth lens, the fifth lens, and the sixth lens is made of a different material.

* * * * *